United States Patent
Chen et al.

(10) Patent No.: US 9,754,421 B2
(45) Date of Patent: *Sep. 5, 2017

(54) GENERATING INFORMATIVE VIEWPOINTS BASED ON EDITING HISTORY

(71) Applicant: AUTODESK, INC., San Rafael, CA (US)

(72) Inventors: Hsiang-Ting Chen, Taichung (TW); Tovi Grossman, Toronto (CA); Wei Li-Yi, Toronto (CA); Ryan Michael Schmidt, Toronto (CA); Bjoern Hartmann, San Francisco, CA (US); George Fitzmaurice, Toronto (CA); Maneesh Agrawala, Oakland, CA (US)

(73) Assignee: AUTODESK, INC., San Rafael, CA (US)

( * ) Notice: Subject to any disclaimer, the term of this patent is extended or adjusted under 35 U.S.C. 154(b) by 179 days.

This patent is subject to a terminal disclaimer.

(21) Appl. No.: 14/697,504

(22) Filed: Apr. 27, 2015

(65) Prior Publication Data

US 2015/0235475 A1    Aug. 20, 2015

Related U.S. Application Data

(63) Continuation of application No. 13/802,514, filed on Mar. 13, 2013, now Pat. No. 9,019,270.

(51) Int. Cl.
*G06T 19/00* (2011.01)
*G06T 19/20* (2011.01)
*G06T 17/10* (2006.01)

(52) U.S. Cl.
CPC ............. *G06T 19/20* (2013.01); *G06T 17/10* (2013.01); *G06T 19/00* (2013.01); *G06T 2200/04* (2013.01); *G06T 2219/004* (2013.01); *G06T 2219/2004* (2013.01); *G06T 2219/2008* (2013.01)

(58) Field of Classification Search
None
See application file for complete search history.

(56) References Cited

PUBLICATIONS

Agarwala, et al., "Interactive digital photomontage", ACM Trans. Graph. 23, 3, 2004, pp. 294-302.
Azam et al., "ShowMotion—Camera Motion based on 30 Design Review," ACM, 2006.
(Continued)

*Primary Examiner* — Nicholas R Wilson
(74) *Attorney, Agent, or Firm* — Artegis Law Group, LLP

(57) ABSTRACT

One embodiment of the invention is a collage engine that generates informative viewpoints of a 3D model based upon the editing history of the 3D model. In operation, the collage engine processes an editing log to identify segments of the 3D model that include related vertices. For a given segment, the collage engine selects a viewpoint used by the end-user to edit the 3D model and a viewpoint used by the end-user to inspect the 3D model. The collage engine may then present the informative viewpoints to the end-user for inclusion in a collage of 2D renderings based upon the informative viewpoints. Generally, the viewpoints used while editing and inspecting the 3D model are of importance in the overall presentation of the 3D model. Therefore, collages of 2D renderings based upon the informative viewpoints can be generated effectively.

20 Claims, 11 Drawing Sheets

(56) References Cited

PUBLICATIONS

Burtnyk, et al., "Stylecam: interactive stylized 3d navigation using integrated spatial & temporal controls", ACM UIST, 2002, pp. 101-110.
Burtnyk, et al., "Showmotion: camera motion based 3d design review", ACM I3D, 2006, pp. 167-174.
Chen, et al., "Nonlinear revision control for images", ACM Siggraph, Article 105, 2011.
Chen, et al., "Schelling points on 3D surface meshes", ACM Siggraph, Article 29, 2012.
Chi, et al., "MixT: Automatic generation of step-bystep mixed media tutorials", ACM UIST, 2012, pp. 1499-1504.
Christie et al., "Camera control in computer graphics: models, techniques and applications", ACM Siggraph Asia Courses, 2009, pp. 3:1-3:197.
Denning, et al., "Mesh Flow: Interactive Visualization of Mesh Construction Sequences", ACM Siggraph, Article 66, 2011.
Diakopoulos et al., "Mediating photo collage authoring", ACM UIST, 2005, pp. 183-186.
Feixas, et al., "A unified information-theoretic framework for viewpoint selection and mesh saliency", ACM Trans. Appl. Percept., 2009, pp. 6(1):1:1-6(1):1:23.
Fitzmaurice, et al., "Safe 3D Navigation", 2008, In Proc. ACM I3D, pp. 7-15.
Fogarty, et al., "Aesthetic information collages: generating decorative displays that contain information", ACM UIST, 2001, pp. 141-150.
Gal, et al., "3D collage: expressive non-realistic modeling", ACM NPAR, 2007, pp. 7-14.
Grabler, et al., Generating photo manipulation tutorials by demonstration. ACM Trans. Graph. 28, 3, 2009, pp. 66:1-66:9.
Grossman, et al., "Chronicle: Capture, exploration, and playback of document workflow histories", Proc. of UIST '10, ACM, 2010, pp. 143-152.
Hamid, et al., "Supervised learning of salient 2d views of 3d models." Journal of the Society for Art and Science, 7(4): 2008, pp. 124-131.
Huang, et al., "Arcimboldo-like collage using internet images", ACM Siggraph Asia. Article 155, 2011.
Kim, et al., "Interactive mosaic generation for video navigation", Multimedia, 2006, pp. 655-658.
Kirk, et al., "Understanding photowork", ACM CHI, 2006, pp. 761-770.
Koller, et al., "Protected interactive 3d graphics via remote rendering", ACM Siggraph, 2004, pp. 695-703.
Lee, et al., "Mesh saliency", ACM Siggraph, 2005, pp. 659-666.
Mun et al., "A set of standard modeling commands for the history-based parametric approach," 2003, Elsevier Ltd.
Rother, et al., "AutoCollage", ACM Siggraph, 2006, pp. 847-852.
Rubinstein, et al., "A comparative study of image retargeting", Siggraph Asia, Article 160, 2010.
Schmidt, et al., "MeshMixer: an interface for rapid mesh composition", ACM Siggraph Talks, Article 6, 2010.
Schmidt, et al., "Sketching and Composing Widgets for 3D Manipulation", Computer. Graph. Forum, 27(2), 2008, pp. 301-310.
Secord et al., "Perceptual Models of Viewpoint Preference," ACM Trans. Graph. Article 109, 2011.
Shamir, "A Survey on Mesh Segmentation Techniques," Computer Graphics forum, v.27, 2008, 27(6), pp. 1539-1556.
Shilane et al., "Distinctive regions of 3d surfaces", ACM Trans. Graph. Article 7, 2007.
Singh et al., Visualizing 3d scenes using non-linear projections and data mining of previous camera movements. Afrigraph, 2004, pp. 41-48.
Tsang, et al., "Temporal thumbnails: rapid visualization of time-based viewing data", AVI, 2004, pp. 175-178.
Wang, et al., "Picture Collage", IEEE CVPR, 2006, pp. 347-354.
Xiao, et al., "Mixed-initiative photo collage authoring", Multimedia, 2008, pp. 509-518.
Yamaguchi, et al., "Octreerelated data structures and algorithms", IEEE Computer Graphics and Applications, 1985, pp. 53-59.
Yamauchi, et al., "Towards stable and salient multi-view representation of 3d shapes", IEEE SMI, 2006, pp. 40-48.

EDITING LOG    125

| EDIT RECORD | 210 (0) |
|---|---|
| EDIT RECORD | 210 (1) |
| CAMERA RECORD | 220 (0) |
| CAMERA RECORD | 220 (1) |
| ⋮ | ⋮ |
| EDIT RECORD | 210 (E-1) |
| CAMERA RECORD | 220 (V-1) |

FIG. 2A

EDIT RECORD 210

| OPERATION ID 212 | ELAPSED TIME 214 | AFFECTED VERTICES 216 | CAMERA DATA 218 (0) |
|---|---|---|---|

FIG. 2B

CAMERA RECORD 220

| OPERATION ID 212 | ELAPSED TIME 214 | CAMERA DATA 218 (1) | CAMERA DATA 218 (2) | ..... | CAMERA_DATA 218 (C-1) |
|---|---|---|---|---|---|

FIG. 2C

GENERATING INFORMATIVE VIEWPOINTS BASED ON EDITING HISTORY

CROSS-REFERENCE TO RELATED APPLICATIONS

This application is a continuation of the U.S. patent application titled, "GENERATING INFORMATIVE VIEWPOINTS BASED ON EDITING HISTORY," filed on Mar. 13, 2013 and having Ser. No. 13/802,514. The subject matter of this related application is hereby incorporated herein by reference.

BACKGROUND OF THE INVENTION

Field of the Invention

Embodiments of the present invention generally relate to 3D modeling and, more specifically, to generating informative viewpoints based on editing history.

Description of the Related Art

The presentation of a three-dimensional (3D) model in a venue such as an online forum or the sharing of a 3D model with a manager or a peer for review is common practice for an author of a 3D model. However, sharing the 3D model in the same format used to create or edit the 3D model is not always convenient. The file containing the 3D model may be too large to transmit to a reviewer easily, the reviewer may not have access to the correct software program for opening and viewing the 3D model, or the reviewer might find navigating the 3D model difficult and time consuming. There may also be piracy concerns involved with presenting the 3D model in any type of open or non-secure forum. Therefore, the author of the 3D model oftentimes generates and distributes collages or collections of two-dimensional (2D) renderings of the 3D model to the reviewers. Typically, the 2D renderings or collages are easier to transmit, may be viewed with standard desktop computer software, and limit the author's exposure to piracy.

In order to represent the 3D model via a collection of 2D renderings with reasonable accuracy, the 2D renderings should be created from previously determined viewpoints of the 3D model that show important features of the 3D model. To select viewpoints from which informative representations of those features may be captured (i.e. "informative" viewpoints), the author usually has to explore each such feature from many different viewpoints. Rotating, panning, and zooming around the 3D model to identify and then select these informative viewpoints requires complex user input, which is oftentimes tedious and time-consuming. This navigation of the 3D model oftentimes makes the manual creation of a collage of 2D renderings an overly burdensome process. Therefore, systems to automate the selection of viewpoints of 3D models have been developed to assist in the creation of collages of 2D renderings.

Existing systems for automating the selection of informative viewpoints attempt to identify important features of the 3D model and then select viewpoints of the 3D model that show the identified features. Generally speaking, these systems correlate the importance of a feature with either the amount of time a reviewer of the completed 3D model spent viewing the feature or with the geometric complexity of the feature.

One drawback of selecting viewpoints based upon the behavior of a reviewer is that a reviewer must manually explore a completed 3D model, which is time-consuming and difficult for a reviewer. The amount of time required for a reviewer to navigate the 3D model is comparable to the time required to select informative viewpoints manually, so systems based upon the behavior of a reviewer provide little advantage over creating a collage manually.

One drawback of selecting viewpoints based upon geometric complexity is that complexity does not necessarily equate to importance. For example, techniques exist in the field of 3D modeling that are capable of producing geometrically complex regions that may be of little interest to a viewer of the 3D model. In applying such a technique, an author of a 3D model of a person may sculpt hair by quickly scribbling across the surface of the head of the 3D model. The hair would have a high-level of geometric complexity but would not be of much importance in the overall presentation of the person. A system configured to select viewpoints based on geometric complexity would likely select viewpoints of different patches of hair, but not of the face or body of the person. Consequently, a collage of 2D renderings of only the hair of the person would not properly represent the entirety of the modeled person and would not capture the most important features of the modeled person.

As the foregoing illustrates, what is needed in the art is a more effective way to generate informative viewpoints for a 3D model when creating a collage of 2D renderings that represent the 3D model.

SUMMARY OF THE INVENTION

One embodiment of the present invention sets forth a computer-implemented method for generating a collage of two-dimensional (2D) renderings that represent a three-dimensional (3D) model, including recording a plurality of edit records in an editing log, where each edit record reflects an edit operation applied to one or more vertices associated with the 3D model and reflects a viewpoint implemented to render the 3D model during the edit operation, generating a plurality of segments, where each segment represents a different surface region of the 3D model and includes plurality of vertices associated with the different surface region, selecting a first edit record in the plurality of edit records corresponding to a first segment in the plurality of segments, where the first edit record reflects a first edit operation applied to one or more vertices associated with the 3D model and included within the first segment and reflects a first viewpoint implemented to render the 3D model during the first edit operation, generating a first 2D rendering of the 3D model that represents the first segment relative to a perspective associated with the first viewpoint for inclusion in the collage of 2D renderings that represent the 3D model.

One advantage of the disclosed technique is that, given a 3D model, informative viewpoints that include the viewpoints used by the end-user to inspect and edit the 3D model are automatically determined. Collages of 2D renderings that represent the 3D model can, thus, be generated effectively.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 2A-2C illustrate data related to an editing log, according to one embodiment of the present invention;

DETAILED DESCRIPTION

In the following description, numerous specific details are set forth to provide a more thorough understanding of the present invention. However, it will be apparent to one of skill in the art that the present invention may be practiced without one or more of these specific details.

Figure 1:
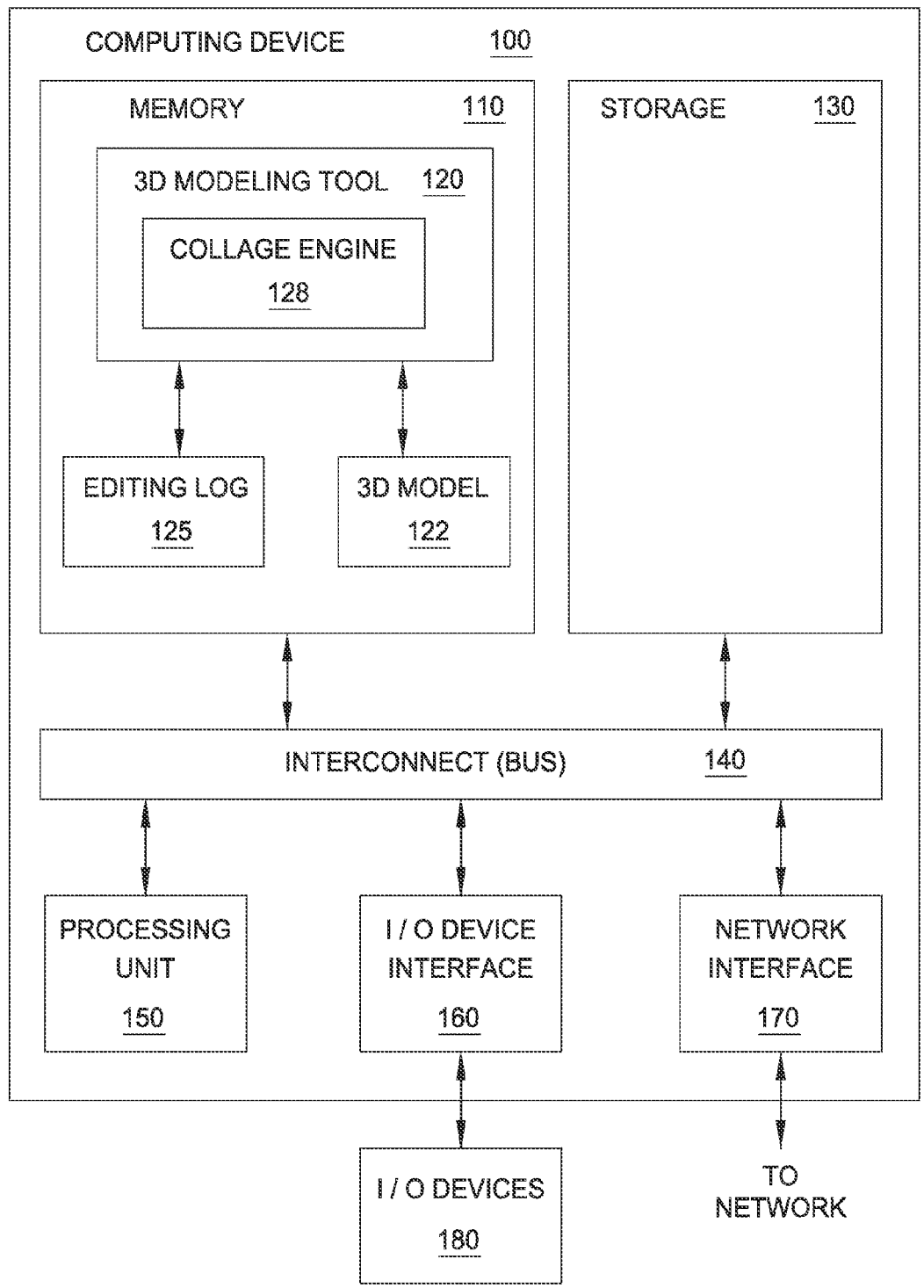
FIG. 1 illustrates a computing device configured to implement one or more aspects of the present invention.

FIG. 1 illustrates a computing device 100 configured to implement one or more aspects of the present invention. As shown, computing device 100 includes an interconnect (bus) 140 that connects a processing unit 150, an input/output (I/O) device interface 160 coupled to input/output (I/O) devices 180, a memory 110, a storage 130, and a network interface 170. Processing unit 150 may be a central processing unit (CPU), a graphics processing unit (GPU), or a combination of different processing units, such as a CPU configured to operate in conjunction with a GPU. In general, processing unit 150 may be any technically feasible hardware unit capable of processing data and/or executing software applications. Further, in the context of this disclosure, the computing elements shown in computing device 100 may correspond to a physical computing system (e.g., a system in a data center) or may be a virtual computing instance executing within a computing cloud.

I/O devices 180 may include devices capable of receiving input, such as a keyboard, a mouse, a video camera, a three-dimensional (3D) scanner, and so forth, as well as devices capable of providing output, such as a display device, a speaker, and so forth. Additionally, I/O devices 180 may include devices capable of both receiving input and providing output, such as a touchscreen, a universal serial bus (USB) port, and so forth. I/O devices 180 may be configured to receive various types of input from an end-user of computing device 100, and to also provide various types of output to the end-user of computing device 100.

Memory 110 may include a random access memory (RAM) module, a flash memory unit, or any other type of memory unit or combination thereof. Processing unit 150, I/O device interface 160, and network interface 170 are configured to read data from and write data to memory 120. Storage 130 may be a disk drive storage device. Although shown as a single unit, storage 130 may be a combination of fixed and/or removable storage devices, such as fixed disc drives, removable memory cards, or optical storage, network attached storage (NAS), or a storage area-network (SAN).

As also shown, memory 110 includes a 3D model 122, a 3D modeling tool 120, and an editing log 125. 3D model 122 may be any technically feasible type of mathematical model, including a polygonal mesh, a point cloud, a wireframe model, a manifold, and so forth. The 3D modeling tool 120 is a software application that may be executed by the processing unit 150. The 3D modeling tool 120 is configured to generate and/or modify the 3D model 122. The 3D modeling tool 120 may also be configured to position the 3D model 122 within a larger 3D coordinate space maintained by the 3D modeling tool within memory 110. The 3D modeling tool 120 may also be configured to generate a graphical user interface (GUI) that provides to an end-user various tools for editing 3D model 122. The 3D modeling tool 120 is configured to generate a 2D rendering of the 3D model 122 and display that rendering within a viewport included in the display space of the GUI. The 3D modeling tool 120 may create the 2D rendering from the viewpoint of a virtual camera positioned within the 3D coordinate space.

The end-user may perform edit operations in order to modify 3D model 122 via tools provided by the GUI, and may also perform camera positioning operations in order to modify the viewpoint from which the 2D rendering is generated. For example, the end-user could sculpt the surface of the 3D model 122 via a sculpting brush provided by the GUI. Then, the end-user could manipulate a camera position to display the 3D model 122 from various viewpoints.

The 3D modeling tool 120 is configured to record the edit and camera operations used to modify the 3D model 122 and manipulate the camera position, respectively, in the editing log 125. The 3D modeling tool 120 is configured to implement a collage engine 128 that generates a collage of 2D renderings of the 3D Model 122. The collage engine 128 selects viewpoints from the editing log 125, and generates the collage of 2D rendering from the selected viewpoints. The selected viewpoints may be associated with edit and/or camera operations.

FIGS. 2A-2C illustrate data related to an editing log 125, according to one embodiment of the present invention. As shown in FIG. 2A, the editing log 125 includes edit records 210 and camera records 220. The 3D modeling tool 120 appends edit records 210 to the editing log 125 in response to edit operations. An edit operation may be any operation that causes 3D modeling tool 120 to modify 3D model 122 based on input received from the end-user. An edit operation could be, for example, the end-user sculpting the surface of 3D model 122 with a sculpting brush by dragging the brush across the surface of the 3D model 122. The 3D modeling tool 120 may determine that the edit operation is complete when a threshold amount of time has elapsed since receiving input from the end-user related to modifying 3D model 122. Upon determining that an edit operation is complete (e.g., determining that the end-user has released the mouse or released a key on the keyboard, among others), 3D modeling tool 120 generates an edit record 210. The information stored within an edit record 210 is discussed in greater detail below in conjunction with FIG. 2B.

The 3D modeling tool 120 also appends camera records 220 to the editing log 125 in response to camera operations.

To perform a camera operation the end-user could, for example, press a particular keyboard key, click the mouse pointer on the 3D coordinate space encompassing the 3D model 122, drag the mouse pointer across the 3D coordinate space, and then release the mouse pointer and the particular keyboard key. When the particular keyboard key is pressed the 3D modeling tool 120 determines mouse click and drag operations to be camera operations instead of edit operations. The 3D modeling tool 120 may map various keyboard keys to different types of camera operations, such as pan, zoom, or tilt operations. The information stored in a camera record 220 is discussed in greater detail below in conjunction with FIG. 2C.

FIG. 2B shows an edit record 210 from the edit log 125. The edit record 210 includes operation identifier 212, elapsed time 214, affected vertices 216, and camera data 218. The operation identifier 212 is a unique data value that distinguishes each edit record 210 in the editing log 125. The elapsed time 214 is the length of time that the end-user performed the edit operation. The length of time may be the difference in time between when the end-user first clicks the mouse pointer on the 3D model 122 and when the end-user releases the mouse pointer. The affected vertices 216 is a list of all vertices affected by the associated edit operation.

The camera data 218 is a collection of data values that define the viewpoint from which the 2D rendering displayed to the end-user is generated while the end-user performs the edit operation. The camera data 218 may include a camera position, a camera look-at, and a camera up-vector. The camera position may be a 3D coordinate (XYZ) within the 3D coordinate space from which the 2D rendering is generated. The look-at may be a 3D coordinate at which the camera is directed within the 3D coordinate space. An optical axis is a vector between the camera position and the look-at. The camera up-vector may be a 3D vector (XYZ) that defines the rotation of the camera around the optical axis. The camera data 218 stored within an edit record 210 is discussed in greater detail below in conjunction with FIGS. 3 and 4.

FIG. 2C shows a camera record 220 from the edit log 125. The camera record 220 includes operation identifier 212, elapsed time 214, and camera data 218(1)-218(C-1). The elapsed time 214 is the length of time that the end-user performed the camera operation. The length of time may be the difference in time between when the end-user first clicks the mouse pointer on the 3D model 122 when performing the camera operation, and when the end-user releases the mouse pointer. The camera data 218(1)-218(C-1) includes the camera data 218 that defines the viewpoints from which the 3D model 112 is rendered for display to the end-user during the camera operation. The camera data 218(1)-218(C-1) stored in a camera record 220 are discussed in greater detail below in conjunction with FIG. 5.

Figure 3:
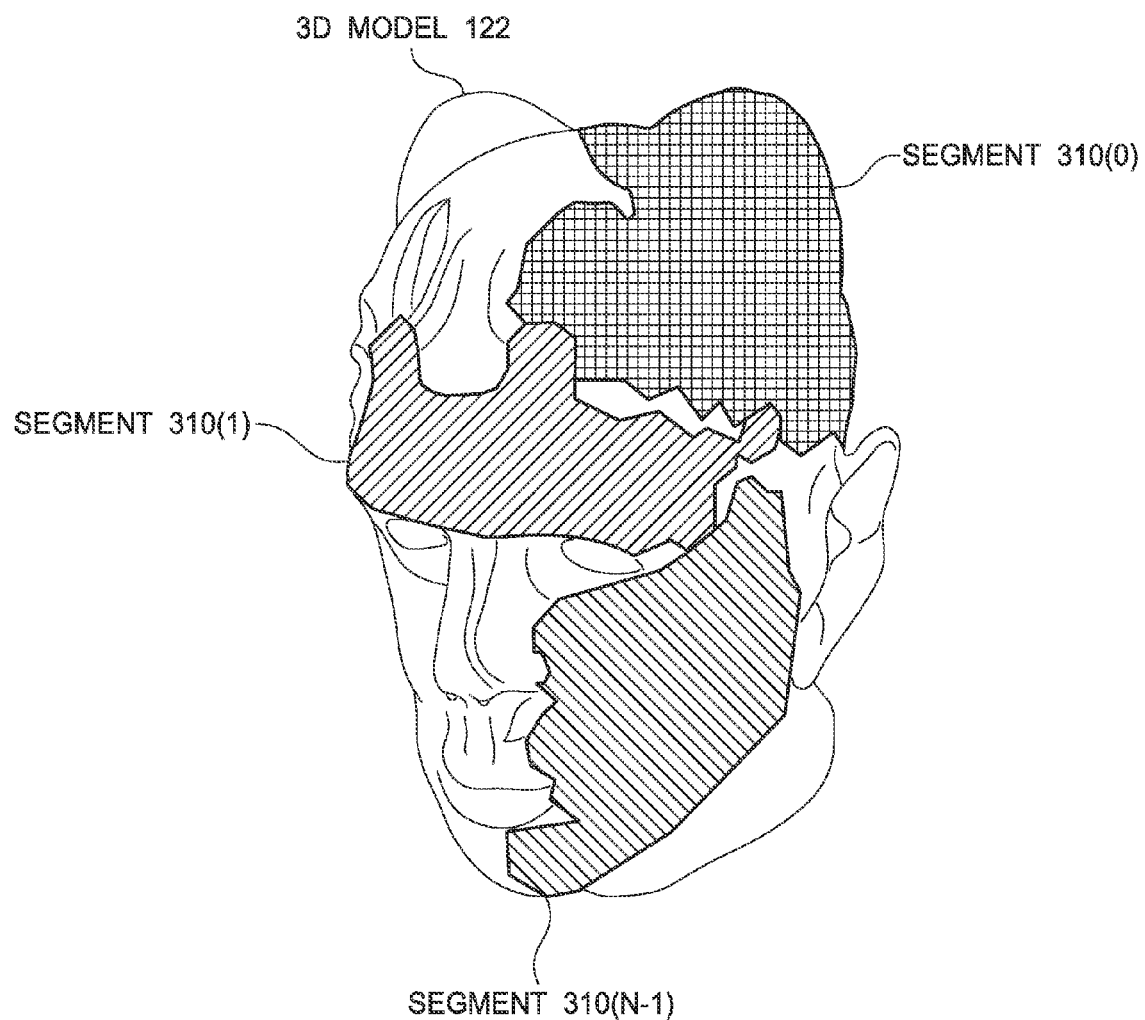
FIG. 3 is a conceptual illustration of segments projected onto the surface of a 3D model, according to one embodiment of the present invention.

FIG. 3 is a conceptual illustration of segments 310 projected onto the surface of a 3D model 122, according to one embodiment of the present invention. As shown, the segments 310 cover various regions on the surface of the 3D model 122. Each segment 310 is a collection of adjoining portions of the 3D model 122, such as vertices, that have similar accumulated sculpting times. The collage engine 128 is configured to determine the accumulated sculpting time for each vertex within 3D model 122. The collage engine 128 stores the accumulated sculpting times in a candidate set. The candidate set may be an array, where each entry includes an index that corresponds to a vertex within the 3D model 122 and a data value that stores the accumulated sculpting time of the vertex. The collage engine 128 may determine the accumulated sculpting time for a given vertex by aggregating the elapsed time 214 of every edit record 210 within the editing log 125 with affected vertices 216 that includes the given vertex.

Once the collage engine 128 calculates and stores the accumulated sculpting time for each vertex within the 3D model 122, the collage engine 128 then extracts segments 310 from the candidate set using a greedy region-growing routine. Following the greedy region-growing routine, the collage engine 128 selects the vertex with the greatest accumulated sculpting time in the candidate set as the first vertex of a segment 310(0). Then, the collage engine 128 determines which vertices are adjacent to the segment 310(0). The collage engine 128 may determine two vertices to be adjacent when those two vertices share an edge. The collage engine 128 adds vertices from the candidate set that are adjacent and have accumulated sculpting times greater than a certain threshold to the segment 310(0). The threshold may be 70 percent of the average accumulated sculpting time of the vertices within the segment 310(0), among other thresholds. As the collage engine 128 adds each vertex to the segment 310(0), the collage engine 128 removes the vertex from the candidate set. The collage engine 128 continues to add adjacent vertices to the segment 310(0) until there are no more adjacent vertices with accumulated sculpting times over the threshold. Once the new segment 310(0) is extracted, the collage engine 128 repeats the greedy region-growing routine to extract additional segments 310(1) and 310(2). The collage engine 128 extracts the additional segments 310(1) and 310(2) from the vertices remaining within the candidate set; the vertices not already extracted into a segment 310. The collage engine 128 may also rank the segments 310 according to the order with which those segments were extracted. For instance, if the collage engine 128 extracts segment 310(0) first, then the collage engine 128 ranks the segment 310(0) as the top ranked segment 310.

The collage engine 128 may further expand the segment 310(0) by adding other vertices affected by the edit operations associated with the vertices already added to segment 310(0). Specifically, the collage engine 128 may add the vertices listed in the affected vertices 216 of each edit record 210 corresponding to a vertex that is already associated with the segment 310(0). For instance, if the affected vertices 216 of an edit record 210 includes eight vertices, but the segment 310(0) only includes three of the eight vertices, then the collage engine 128 could add the remaining five vertices to the segment 310(0).

The 3D modeling tool 120 may be configured with the option of automatically applying edit operations symmetrically to the 3D model 122. Symmetric edit operations equally affect vertices on both sides of a symmetric 3D model, such as a model 122 of a person. For instance, if 3D model 122 represented a person, an end-user may edit the ears of the 3D model 122 with a symmetric edit operation, so that the vertices of the ears mirror each other. The affected vertices 216 of the resulting edit record 210 would include vertices from opposite sides of the 3D model 122. If an extracted segment 310 includes the vertices of one ear within the 3D model 122, then the collage engine 128 would expand the segment 310 to include the vertices of both ears.

The embodiment illustrated in FIG. 3 is illustrative only and in no way limits the scope of the present invention. In other embodiments, various modifications of the feature and functions of the collage engine 128 are contemplated. For example, one of ordinary skill in the art will recognize that the greedy region-growing is used as a reference example of a routine to extract the segments 310 and that a variety of other routines could be used. Further, the collage engine 128 could display the accumulated sculpting times of the vertices as a heat-map on the surface of the 3D model 122. For instance, the collage engine 128 could assign a color to each vertex based upon the accumulated sculpting time or the percentage of total accumulated sculpting time of the vertex. In addition, the accumulated sculpting times could be calculated for various periods of editing time, such as the period between save operations. The end-user may perform a save operation to store a copy of the 3D model 122 within storage 130. The collage engine 128 may create a 2D rendering of the 3D model 122 in conjunction with each save operation. These 2D renderings may include heat-maps representing the accumulated sculpting times of the vertices during the different periods. The collage engine 128 could then combine these 2D renderings into a collage of 2D renderings that represents the revision history of the 3D model 122.

Figure 4:
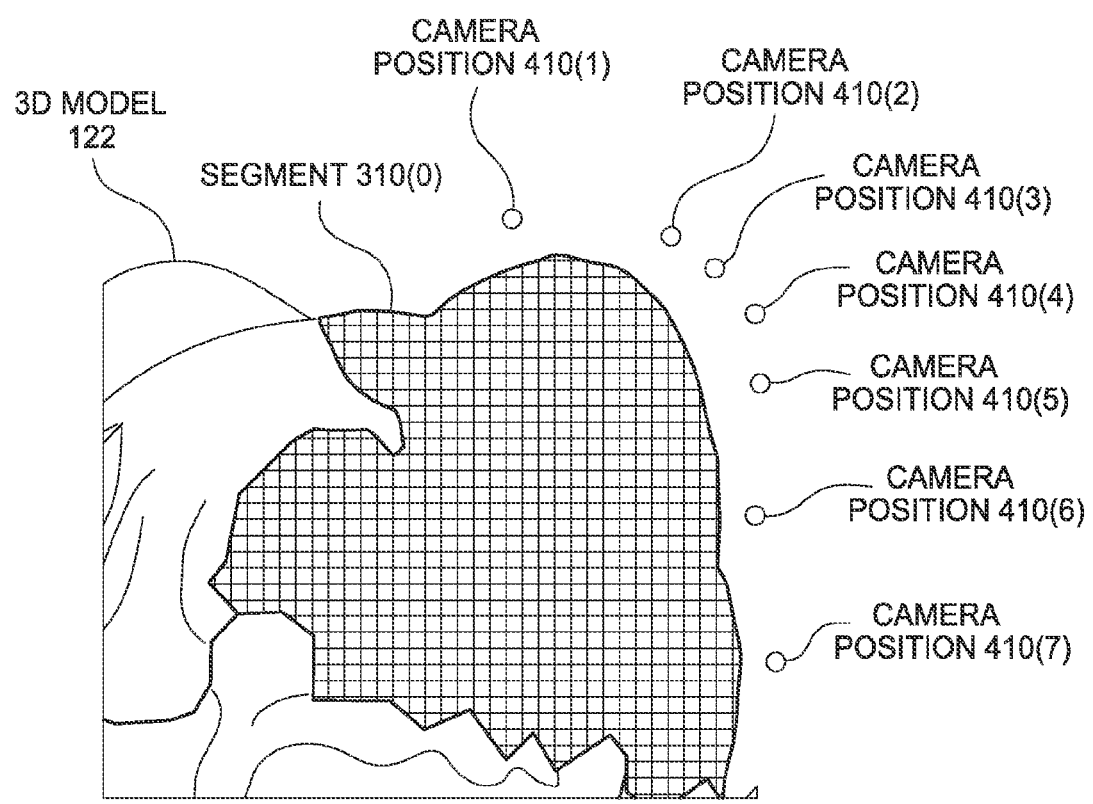
FIG. 4 is a conceptual illustration of multiple cameras positions surrounding a 3D model, according to one embodiment of the present invention.

FIG. 4 is a conceptual illustration of multiple camera positions 410(0)-410(7) surrounding a 3D model 122, according to one embodiment of the present invention. As shown, a segment 310(0) included within the 3D model 122 is surrounded by various camera positions 410(0)-410(7). The collage engine 128 retrieves the camera data 218, which includes the camera positions 410(0)-410(7), from the edit records 210 associated with the segment 310(0).

The collage engine 128 is configured to select a single camera data 218 that includes a camera position from which segment 310(0) may be viewed. The selected camera data 218 and associated camera position represent an "informative" viewpoint from which segment 310(0) may be viewed in detail. The collage engine 128 selects this informative viewpoint by applying a spatial clustering routine to the camera positions 410(0)-410(7). To apply the spatial clustering routine, the collage engine 128 first builds an octree spatial decomposition with the camera positions 410(0)-410(7) included in the camera data 218. The octree spatial decomposition recursively partitions the 3D coordinate space encompassing the 3D model 122 into increasingly granular cells. The cells include some portion of the 3D coordinate space. Each parent cell of the octree spatial decomposition could include eight child cells of greater granularity. The portion of the 3D coordinate space included within a child cell is also included in the less granular parent cell. A child cell may also be a parent cell to an additional group of smaller child cells. The smallest cells are leaf cells, which do not include any child cells. The camera positions 410 are 3D coordinates (XYZ) within the 3D coordinate space, so each camera position 410 is included in the 3D coordinate space assigned to a leaf cell. The camera position 410 is also within a series of increasingly less granular parent cells that include increasingly larger portions of the 3D coordinate space encompassing the leaf cell. The collage engine 128 matches a leaf cell to a camera position 410 included within a camera data 218 of an edit record 210. Thus, the collage engine 128 inserts the camera data 218 and elapse time 214 of each edit record 210 associated with the segment 310 into a leaf cell, which is associated with one or more parent cells.

After building the octree spatial decomposition, the collage engine 128 determines the accumulated camera time of each cell and the total accumulated camera time of all the camera positions 410(1)-410(7). The collage engine 128 determines the accumulated camera time of each cell by summing the elapsed time 214 of the edit records 210 with camera locations 410 located within the cell. The collage engine 128 then determines a "dominant" cell. The dominant cell may be the most granular cell with an accumulated camera time that is at least 70% of the total accumulated camera time.

Once the dominant cell is determined, the collage engine 128 calculates a weighted average center location of the camera positions 410 within the dominant cell. The weighted average center may be weighted by the elapsed times 214 in the edit records 210 associated with the camera positions 410. Finally, the collage engine 128 selects the camera position 410 closest to the weighted average center location. For example, if the camera positions 410(2)-410(5) were included within the dominant cell, and the camera position 410(3) was closest to the weighted average center location, then the collage engine 128 would select camera position 410(3).

The selected camera position 410 originates from the camera data 218 of an edit record 210. The collage engine 128 stores the camera data 218 that includes selected camera position 410 as representative of an informative viewpoint for the segment 310(0). The collage engine 128 generates and stores informative viewpoints for each set of edit records 210 associated with a segment 310. The end-user may then include these various informative viewpoints in a collage, as described in greater detail below in conjunction with FIG. 6.

The embodiment illustrated in FIG. 4 is illustrative only and in no way limits the scope of the present invention. In other embodiments, various modifications of the feature and functions of the collage engine 128 are contemplated. For example, one of ordinary skill in the art will recognize that the spatial clustering routine is used as a reference example of a routine to select the camera positions 410 and that a variety of other routines could be used.

Generally, the informative viewpoints generated from the edit records 210 associated with a segment are based upon camera positions 410 in close proximity to the segment 310. These informative viewpoints may display the granular details of the segment 310 or portions of the segment 310. However, additional informative viewpoints may be generated from the camera records 220 associated with the same segments 310. The additional informative viewpoints could display the entire segment 310 or the segment 310 with surrounding portions of the 3D model 122.

Figure 5:
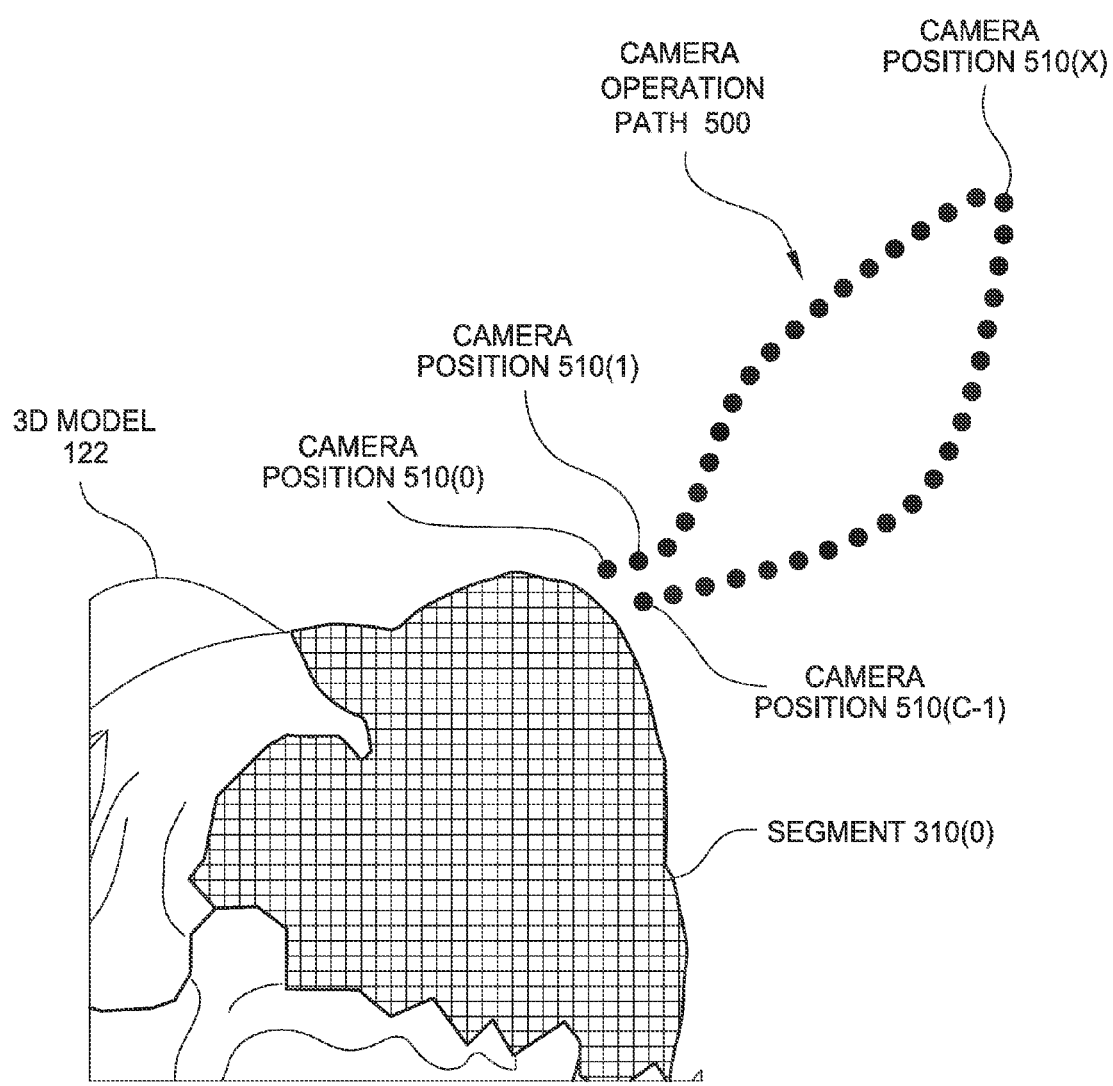
FIG. 5 is a conceptual illustration of a camera operation path proximate to a 3D model, according to one embodiment of the present invention.

FIG. 5 is a conceptual illustration of a camera operation path 500 proximate to a 3D model 122, according to one embodiment of the present invention. As shown, the camera operation path 500 includes camera positions 510(0)-510(C-1) from a camera record 220 associated with the segment 310(0). If a camera record 220 is stored between two edit records 210 associated with the same segment 310(0), then the camera record 220 is also associated with the segment 310(0). In operation, the camera record 220 represents a camera operation that occurred between two edit operations that affected the vertices of the segment 310(0).

As described, the 3D modeling tool 120 uses the various camera positions 510(0)-510(C-1) to display viewpoints of the 3D model 112 to the end-user during the camera operation. The 3D modeling tool 120 may display viewpoints at regular intervals or when the end-user pauses the movement of the mouse across the 3D model 122. For example, the 3D modeling tool 120 may display the viewpoints from the camera positions 510(0)-510(C-1) as the end-user performs a camera operation to inspect the 3D model 122. The end-user may perform the camera operation by zooming-out to inspect the 3D model 122, and then zooming-in to continue editing.

Generally, the end-user may pause at one viewpoint to inspect the 3D model 122 during the camera operation. Therefore, the collage engine 128 is configured to distill the multiple viewpoints included in each camera operation associated with the segment 310(0) into one viewpoint, before proceeding to select an informative viewpoint for the segment 310(0). As discussed, the 3D modeling tool 120 stores the camera operations as camera records 220. The viewpoints used during a camera operation are stored as camera data 218 with each camera record 220. The collage engine 128 selects one camera data 218 from each camera record 220. To evaluate a camera record 220, the collage engine 128 first computes the opening angles from the camera data 218 representing each viewpoint. The collage engine 128 computes the opening angle based on the camera position 510 and camera look-at data within the camera data 218. The opening angle determines the size of the 3D model 122 within the viewpoint. The 3D model 122 appears the smallest from the viewpoint with the largest opening angle. After computing the opening angle for each camera data 218 within a camera record 220, the collage engine 128 selects the camera data 218 with the largest computed opening angle. The camera data 218 with the largest computed opening angle may be at camera position 510(x). The collage engine 128 repeats the selection of the camera data 218 with the largest computed opening angle from each camera record 220 associated with the segment 310(0). As camera data 218 are selected for each camera record 220, the collage engine 128 adds the camera data 218 that represent the viewpoints with the largest opening angle to a set.

Once the set includes a camera data 218 from each camera record 220 associated with the segment 310(0), the collage engine 128 selects one camera data 218 from the set. The collage engine 128 selects the camera data 218 by applying the spatial clustering routine discussed above in conjunction with FIG. 4 on the camera positions 510 within the camera data 218. The collage engine 128 stores the camera data 218 as representative of an informative viewpoint for the segment 310(0). The collage engine 128 generates and stores informative viewpoints for the set of camera records 220 associated with each segment 310. The end-user may then include these various informative viewpoints in a collage, as described in greater detail below in conjunction with FIG. 6.

The embodiment illustrated in FIG. 5 is illustrative only and in no way limits the scope of the present invention. In other embodiments, various modifications of the feature and functions of the collage engine 128 are contemplated. For example, one of ordinary skill in the art will recognize that the spatial clustering routine is used as a reference example of a routine to select the camera positions 510 and that a variety of other routines could be used.

Figure 6:
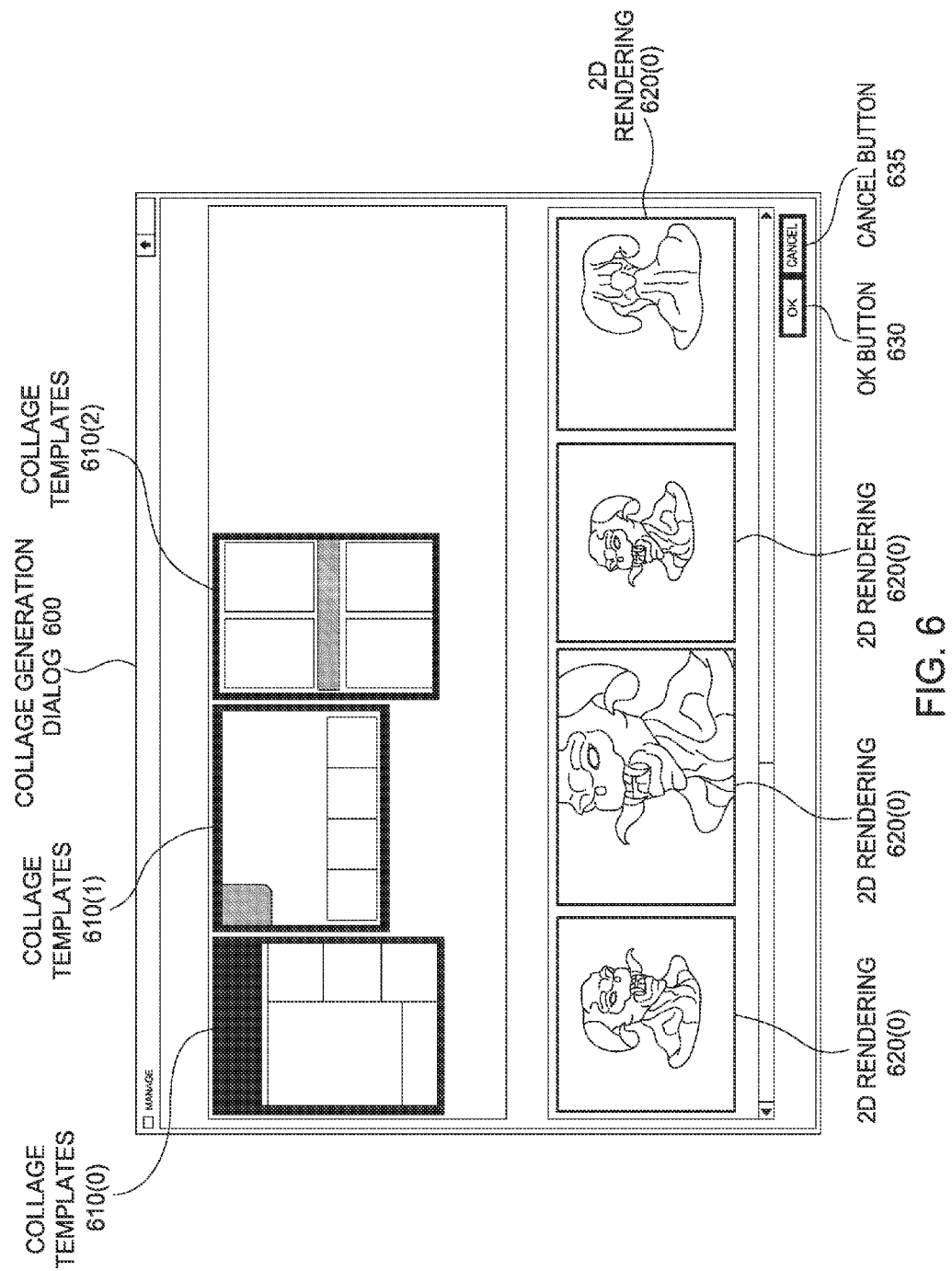
FIG. 6 illustrates a collage generation dialog, according to one embodiment of the present invention.

FIG. 6 illustrates a collage generation dialog 600, according to one embodiment of the present invention. As shown, the collage generation dialog 600 includes collage templates 610, 2D renderings 620, an okay button 630, and a cancel button 635. After selecting the camera data 218 representing informative viewpoints, the collage engine 128 can generate a collage of 2D renderings based on the camera data 218. The collage engine 128 generates the collage of 2D renderings according to input submitted by the end-user through the collage generation dialog 600. The collage templates 610 specify the dimensions of the collage of 2D renderings, as well as the dimensions and positions for the 2D renderings 620 included within the collage of 2D renderings. For instance, a collage template 610(0) may specify a dimension of a standard piece of letter paper, 8.5" by 11". The same collage template 610(0) may further specify a position at the top of the collage of 2D renderings for one large 2D rendering 620(0) and three positions along the bottom of the collage of 2D renderings for three smaller 2D renderings 620(1)-620(3). In operation, the end-user selects the collage templates 610(0), by clicking a mouse pointer on the collage template 610(0).

The 2D renderings 620(0)-620(3) include the informative viewpoints from the edit operations and camera operations associated with each segment 310. The collage engine 128 arranges the 2D renderings 620(0)-620(3) in a list according to the rank of the segments 310. In operation, the end-user may reorder the 2D renderings 620(0)-620(3) by moving a 2D rendering 620 back and forth in the list of 2D renderings 620(0)-620(3). The end-user could move 2D rendering back in the list by, for example, clicking a mouse pointer on 2D rendering 620(0), dragging the mouse pointer to the left across the collage generation dialog 600, and releasing the mouse pointer over the 2D rendering 620(1). In response, the collage engine 128 would move 2D rendering 620(0) back one position in the list and move 2D rendering 620(1) up one position in the list.

In one embodiment, the collage engine 128 may "animate" each 2D rendering 620 by generating a sequence of rendered images that represent the 3D model 122 from a series of viewpoints proximate to the informative viewpoint used to generate the 2D rendering 620. In doing so, the collage engine 2D generates a 1D camera path that passes through the informative viewpoint associated with the 2D rendering 620, and then renders a sequence of images from different viewpoints along that camera path. When the end-user scrolls the mouse wheel over the 2D rendering 620, the collage engine 128 may display those images sequentially, thereby providing the appearance of constrained navigation proximate to the 3D model 122. This functionality may be easily provided within a web page, thereby providing a level of interactivity without significant computational overhead.

In a further embodiment, collage engine 112 may generate a camera path from which to generate the sequence of images associated with a 2D rendering 620 to be animated based on the sculpting and inspection times associated with the corresponding segment. The collage engine 128 fits a curve between a sculpting camera position and an inspection camera position, then interpolates between the position, viewing direction, and distance to the 3D model 112. The collage engine 128 then generates a set of 10 uniformly distributed camera viewpoints along that path from which the different images may be rendered.

Once the end-user selects a collage template 610 and accepts or updates the order of the 2D renderings 620(0)-620(3), the collage engine 128 is ready to generate a collage of 2D renderings. The generation of the collage of 2D renderings begins when the end-user clicks a mouse pointer on the okay button 630. In response the collage engine 128 inserts the 2D rendering 620(0)-620(3) into the selected collage template 610 in the order listed. The collage engine 128 may generate the collage of 2D renderings in a common document format, such as HTML or PDF. The end-user can also cancel the generation of the collage of 2D renderings by clicking a mouse pointer on the cancel button 635.

The collage engine 128 may also generate a "progress collage" that represents the 3D model 112 from a fixed viewpoint after each save point. Collage engine 128 may generate a snapshot of the 3D model 112 each time that model is saved, and may color the surface of the 3D model 112 using a heat-map based on the editing time change relative a previous snapshot. A progress collage may illustrate different sequential snapshots with associated heat maps that illustrate which parts of the 3D model 112 have changed between saved versions. The end-user may also click any of the snapshots, and the collage engine 128 is configured to revert the 3D model 112 to a previous state associated with the clicked snapshot, thereby starting from a desired save point.

The embodiment illustrated in FIG. 6 is illustrative only and in no way limits the scope of the present invention. In other embodiments, various modifications of the feature and functions of the collage engine 128 are contemplated. For example, although the collage engine 128 generates the collage of 2D renderings in response to input received from the end-user, in different embodiments, the collage engine 128 could automatically generate the collage of 2D renderings without such input. In addition, the collage engine 128 could be configured to present the 2D renderings 620(0)-620(3) in a number of different formats. For example, the collage engine 128 could arrange the 2D renderings 620(0)-620(3) into a standard web application or some other interactive presentation that would allow the end-user to navigate through a fixed set of 2D renderings 620(0)-620(3). Further, such an interactive presentation could include 2D renderings of additional viewpoints associated with the camera data 218 representing the informative viewpoints, or other camera data 218 within the editing log 125.

Figure 7:
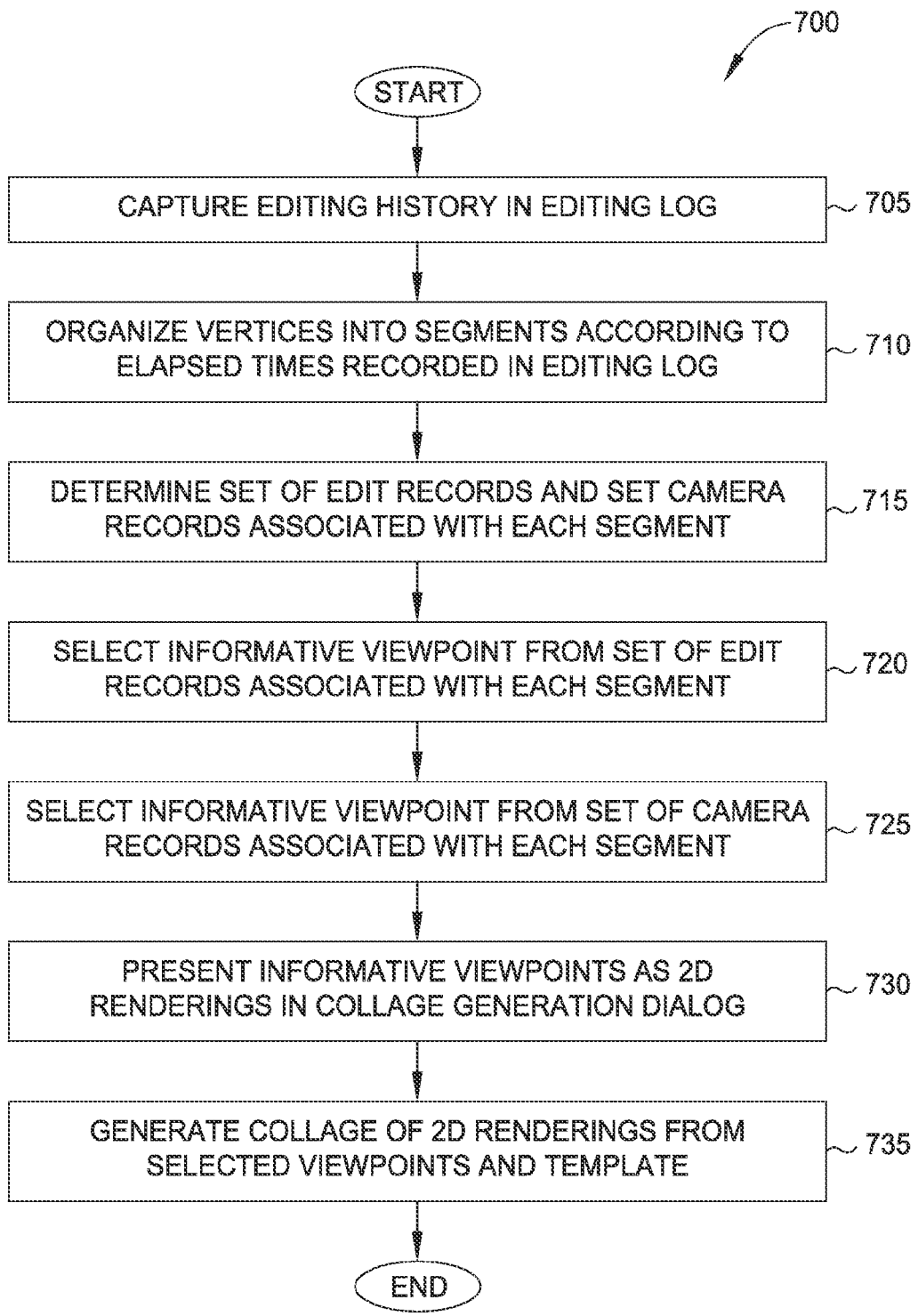
FIG. 7 sets forth a flow diagram of method steps for generating a collage of 2D renderings based on informative viewpoints selected from the editing history of a 3D model, according to one embodiment of the present invention FIGS. 8A-8B set forth a flow diagram detailing one of the method steps of FIG. 7, according to one embodiment of the present invention.

FIG. 7 sets forth a flow diagram of method steps for generating a collage of 2D renderings based on informative viewpoints selected from the editing history of a 3D model, according to one embodiment of the present invention. Although the method steps are described in conjunction with the systems of FIGS. 1-6, persons skilled in the art will understand that any system configured to perform the method steps, in any order, is within the scope of the present invention.

As shown, a method 700 begins at step 705, where the 3D modeling tool 120 of FIG. 1 captures and stores the editing history of the 3D model 122 of FIG. 1. The 3D modeling tool 120 stores the editing history in the editing log 125 of FIG. 1. The editing log 125 may include edit records 210 and camera records 220 as shown in FIG. 2. The edit records 210 store data captured from edit operations, and the camera records 220 store data captured from camera operations. Edit records 210 and camera records 220 include camera data 218, which represent viewpoints presented to the end-user during the edit and camera operations.

At step 710, the collage engine 128, included within the 3D modeling tool 120 shown in FIG. 1, organizes the adjoining portions of the 3D model 122, such as vertices, into the segments 310 of FIG. 3 according to the accumulated sculpting time of each vertex, as determined from the editing log 125. A more detailed flow diagram of step 710 is described in greater detail below in conjunction with FIG. 8.

At step 715, the collage engine 128 determines a set of edit records 210 associated with each segment 310 and a set of camera records 220 associated with each segment 310. If the affected vertices 216 of an edit record 210 include a vertex within a segment 310, then the edit record 210 is associated with the segment 310. The collage engine 128 stores such edit records 210 in the set of edit records 210 associated with the segment 310. If a camera record 220 is stored between two edit records 210 associated with the same segment 310, then the camera record 220 is also associated with the segment 310. The collage engine 128 stores such camera records 220 in the set of camera records 220 associated with the segment 310.

At step 720, the collage engine 128 selects a camera data 218, representative of an informative viewpoint, from the set of edit records 210 associated with each segment 310. The collage engine 128 selects a camera data 218 based on a spatial clustering of the camera positions 410. The camera positions 410 are included in the camera data 218 of all of the edit records 210 associated with a segment 310. A more detailed flow diagram of step 720 is described in greater detail below in conjunction with FIG. 9.

At step 725, the collage engine 128 selects a camera data 218, representative of an informative viewpoint from the set of camera records 220 associated with each segment 310. The collage engine 128 selects a camera data 218 based on a spatial clustering of one camera position 510 from each camera record 220. Specifically, the camera position 510 included in the camera data 218 with the largest calculated opening angles from each of the camera records 220 associated with a segment 310. A more detailed flow diagram of step 725 is described in greater detail below in conjunction with FIG. 10.

At step 730, the collage engine 128 presents informative viewpoints from the selected camera data 218. The collage engine 128 presents the informative viewpoints as suggested 2D renderings 620 within the collage generation dialog 600 of FIG. 6 via a GUI. The collage generation dialog 600 also includes various collage templates 610 of FIG. 6. The end-user may select one of the various collage templates 610 and re-order the 2D renderings 620. The end-user may arrange the 2D renderings 620 in order of importance, as understood by the end-user. Once the end-user is satisfied with the selection of a collage template 610 and the order of the 2D renderings 620, the end-user submits the selections to the collage engine 128 by pressing the okay button 630 of FIG. 6.

At step 735, the collage engine 128 generates a collage of 2D renderings base on the collage template 610 and the 2D rendering 620 selections submitted by the end-user via the collage generation dialog 600. The collage engine 128 inserts the 2D renderings 620 into the selected collage template 610 in the order specified by the end-user. A collage template 610 has a particular number of spaces to display 2D renderings 620. The collage engine 128 inserts a 2D rendering 620 into each space of the collage template 610. There may be more 2D renderings 620 available than spaces in the selected collage template 610. Thus, there may be 2D renderings 620 that the collage engine 128 does not insert into the collage of 2D renderings.

Figure 8A:
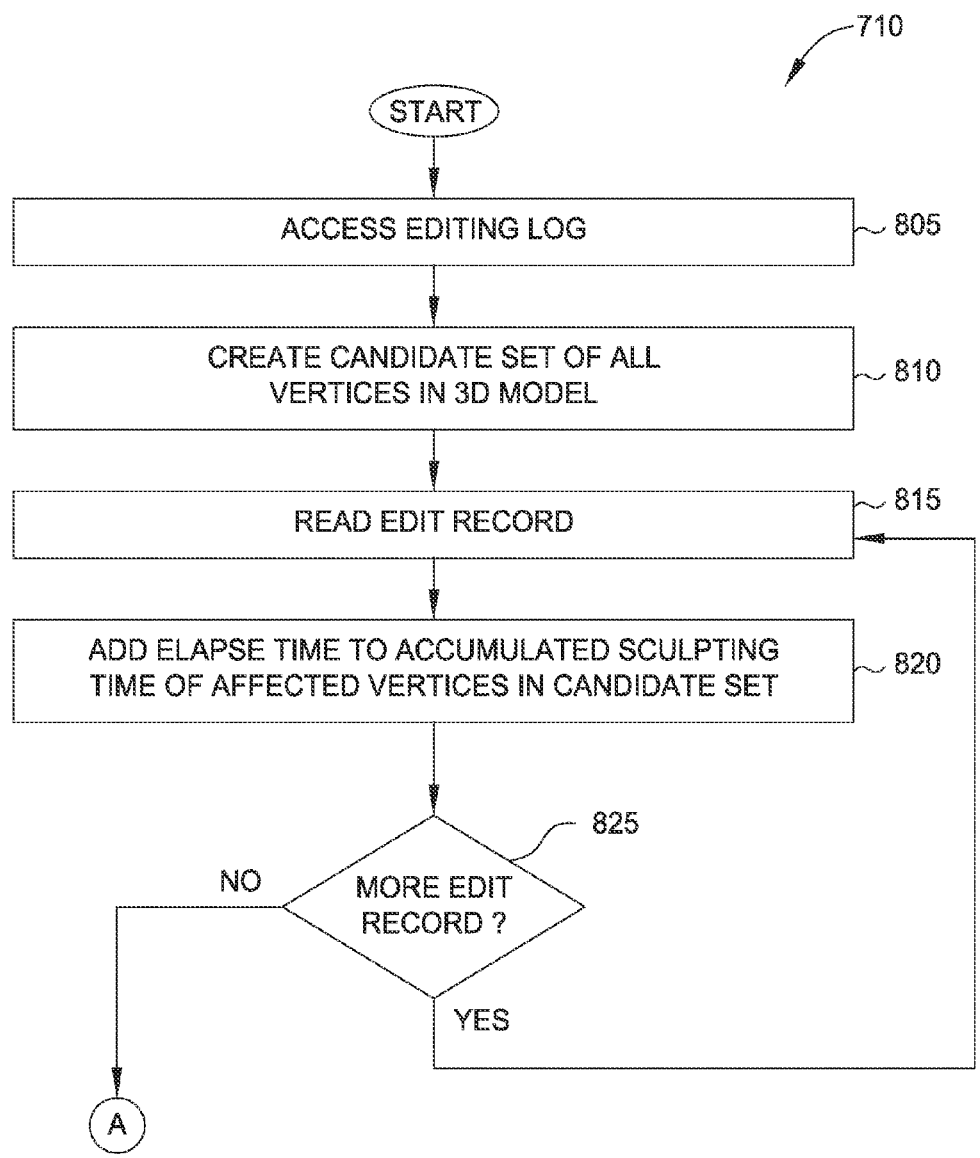
Figure 8B:
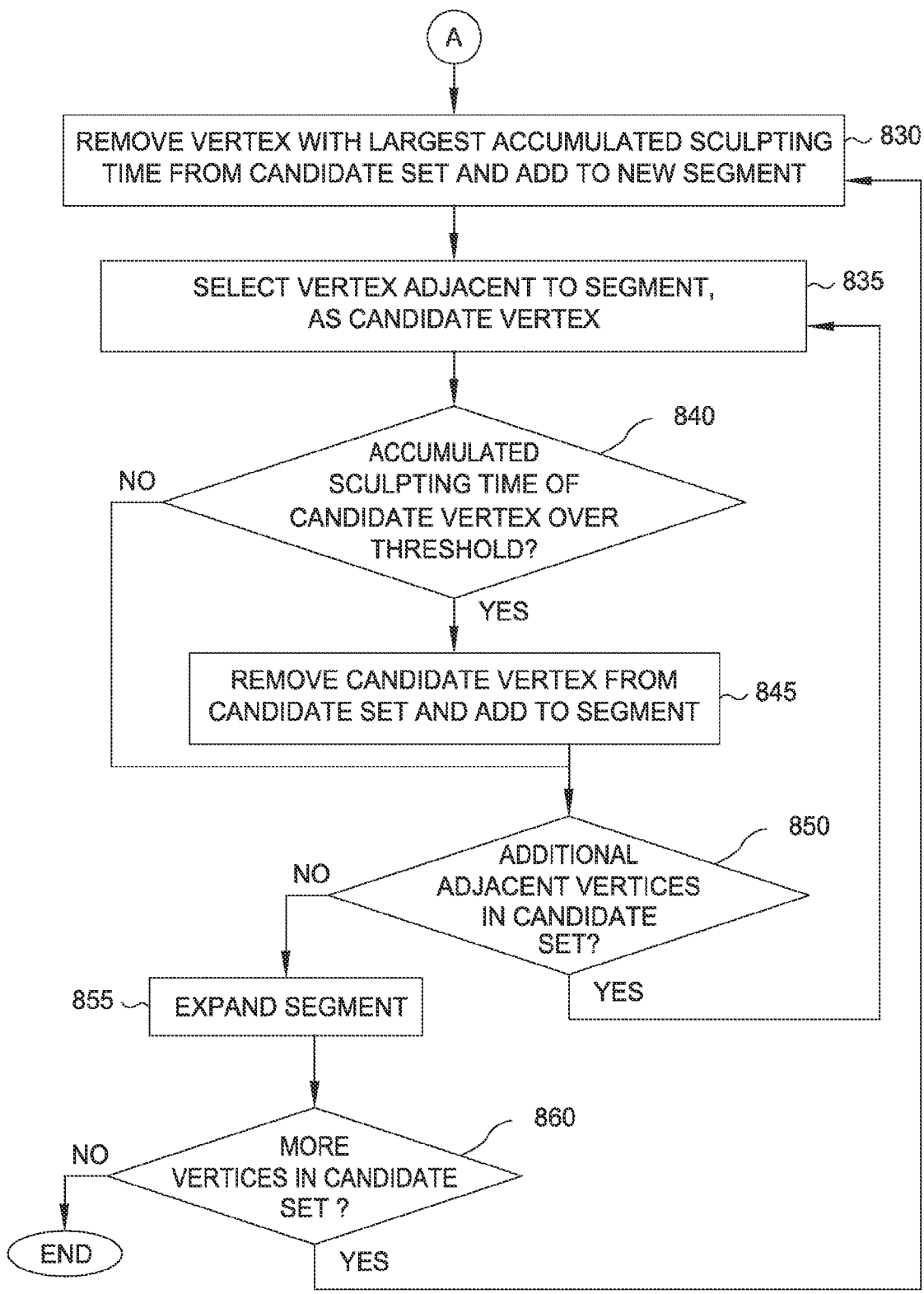

FIGS. 8A-8B set forth a flow diagram detailing step 710 of FIG. 7, according to one embodiment of the present invention. Among other things, FIG. 8 includes method sub-steps for generating segments 310 within the 3D model 122 from an editing log 125. Although the method steps are described in conjunction with the systems of FIGS. 1-6, persons skilled in the art will understand that any system configured to perform the method steps, in any order, is within the scope of the present invention.

As shown, the method sub-steps begin at step 805, where the collage engine 128 shown in FIG. 1 access the editing log 125 also of FIG. 1. While the end-user is editing the 3D model 122, the 3D modeling tool 120, also shown in FIG. 1, stores the editing history in the editing log 125. The collage engine 128 extracts the segments 310 based on the elapsed time 214 and affected vertices 216 of the edit records 210 of FIG. 2 that are stored within the editing log 125. If the editing log 125 is a file, then the collage engine 128 may access the editing log 125 by opening a file stream to the editing log 125 file. The method 710 proceeds to step 810.

At step 810, the collage engine 128 creates a candidate set of all the vertices. If the 3D model 122 is stored as a file, then the collage engine 128 may access the 3D model 122 by opening a file stream to the 3D model 122 file. The collage engine 128 would then parse the 3D model 122 file to identify the vertices and copy the vertices data into entries within the candidate set. The method 710 proceeds to step 815.

At step 815, the collage engine 128 reads an edit record 210 from the editing log 125. If the editing log 125 is stored as a file, then the collage engine 128 may parse the editing log 125 to identify and read an edit record 210. The method 710 proceeds to step 820.

At step 820, the collage engine 128 adds the elapsed time 214 included in the edit record 210 to the accumulated sculpting time of the vertices listed in the affected vertices 216 of the same edit record 210. For each vertex included in the affected vertices 216, the collage engine 128 locates the corresponding vertex in the candidate set, and increments the accumulated sculpting time, stored with the vertex, by the elapse time 214. The method 710 proceeds to step 825.

At step 825, the collage engine 128 determines whether there are more edit records 210 to read. The collage engine 128 may sequentially read the edit records 210 within the editing log 125. If the collage engine 128 finds a subsequent edit record 210 within the editing log 125, then the collage engine 128 determines that there are more edit record 210 to read, and the method 710 returns to step 815. Otherwise, if the collage engine 128 does not find another edit record 210 within the editing log 125, then the collage engine 128 determines that there are no more edit records 210 to read in the editing log 125, and the method 710 proceeds to step 830.

At step 830, the collage engine 128 removes the vertex with the largest accumulated edit time from the candidate set and adds the vertex to a new segment 310. The collage engine 128, finds the vertex with the largest accumulated edit time in the candidate set, before extracting the vertex. The collage engine 128 may sort the candidate set by the accumulated edit times to find the vertex with the largest accumulated edit time. The collage engine 128 removes the vertex with the largest accumulated edit time from the candidate set, so that the collage engine 128 may only add the vertex to one segment 310. The method 710 proceeds to step 835.

At step 835, the collage engine 128 selects a vertex adjacent to the segment 310 as a candidate vertex. A vertex is adjacent to the segment 310 if the vertex shares an edge with a vertex within the segment 310. The first vertex within the segment 310 may have three adjacent vertices. The subsequently added vertices within the segment 310 may have one, two, or no adjacent vertices. The method 710 proceeds to step 840.

At step 840, the collage engine 128 determines whether the accumulated sculpting time of the candidate vertex is over a threshold. The threshold may be 70 percent of the average accumulated sculpting time of the vertices within the segment 310. If the accumulated sculpting time of the candidate vertex is over the threshold, then the method 710 proceeds to step 845.

At step 845, the collage engine 128 removes the candidate vertex from the candidate set and adds the vertex to the segment 310. The collage engine 128 removes the candidate vertex from the candidate set, so that the collage engine 128 may only add the candidate vertex to one segment 310. The method 710 then proceeds to step 850.

At step 850, the collage engine 128 determines whether there are additional adjacent vertices in the candidate set. A vertex is an additional adjacent vertex if the vertex has not been a candidate vertex for the current segment 310 and the vertex shares an edge with a vertex within the segment 310. The collage engine 128 may track each vertex added to the segment 310. To determine if there are additional adjacent vertices in the candidate set, the collage engine 128 would determine if a newly added vertex has any additional adjacent vertices. If the newly added vertex does not have additional adjacent vertices then the collage engine 128 stops tracking the vertex. If the collage engine 128 determines that a newly added vertex has at least one additional adjacent vertex, then the collage engine 128 determines that there are additional adjacent vertices in the candidate set, and the method 710 returns to step 835. Otherwise, if the collage engine 128 determines that there are not additional adjacent vertices, then the segment 310 is complete, and the method 710 proceeds to step 855.

At step 855, the collage engine 128 expands the segment 310 to include all the vertices affected by the same edit operations as the vertices within the segment 310. The collage engine 128 may first identify each edit record 210 associated with the segment 310. An edit record 210 is associated with a segment 310 if a vertex listed in the affected vertices 216 of the edit record 210 is included in the segment 310. Then the collage engine 128 would add any vertices included in the affected vertices 216 of the identified edit records 210 to the segment 310. The method 710 proceeds to step 860.

At step 860, the collage engine 128 determines whether there are more vertices in the candidate set. If collage engine 128 determines at step 860 that there are more vertices in the candidate set, then the collage engine 128 can extract at least one more segment 310, and the method 710 returns to step 830. Otherwise, if the collage engine 128 determines at step 860 that there are no more vertices in the candidate set, then there are no more segments 310 for the collage engine 128 to extract, and then the method 710 ends.

Returning now to step 840, if the collage engine 128 determines that the accumulated sculpting time of the candidate vertex is not over the threshold, then the method 710 proceeds to step 850. At step 850, the collage engine 128 determines whether there are additional adjacent vertices in the candidate set. If the collage engine 128 determines there are additional adjacent vertices in the candidate set, and the method 710 returns to step 835. Otherwise, if the collage engine 128 determines that there are not additional adjacent vertices, then the segment 310 is complete, and the method 710 proceeds to step 855.

At step 855, the collage engine 128 expands the segment 310 to include all the vertices affected by the same edit operations as the vertices within the segment 310. The method 710 proceeds to step 860 and proceeds as described above.

Figure 9:
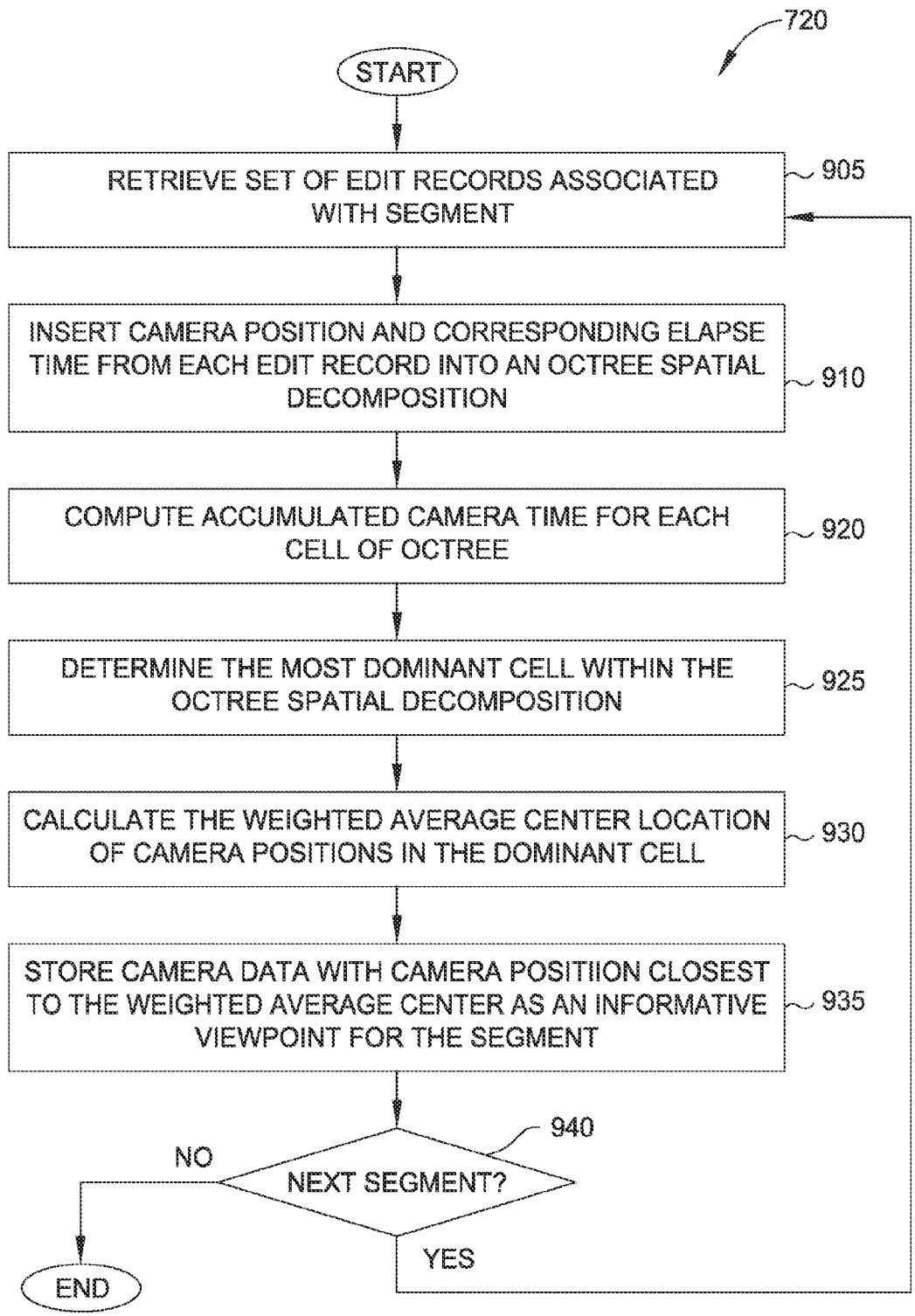
FIG. 9 sets forth a flow diagram detailing another one of the method steps of FIG. 7, according to one embodiment of the present invention.

FIG. 9 sets forth a flow diagram detailing step 720 of FIG. 7, to one embodiment of the present invention. Among other things, FIG. 9 includes method sub-steps for determining an informative viewpoint from the set of edit records 210 associated with each segment 310 within a 3D model 122. Although the method steps are described in conjunction with the systems of FIGS. 1-6, persons skilled in the art will understand that any system configured to perform the method steps, in any order, is within the scope of the present invention.

As shown, the method sub-steps begin at step 905, where the collage engine 128 shown in FIG. 1 retrieves the set of edit records 210 shown in FIG. 2 associated with a segment 310 shown in FIG. 3. The method 720 then proceeds to step 910.

At step 910, the collage engine 128 inserts the camera data 218 and elapsed time 214 of each edit record 210 of FIG. 2 associated with the segment 310 into a cell of an octree spatial decomposition. The collage engine 128 inserts the camera data 218 and elapsed time 214 according to the camera position 410 in the camera data 218. The octree spatial decomposition is a data structure that the collage engine 128 builds by recursively partitioning the 3D coordinate space encompassing the 3D model 122 of FIG. 1 into increasingly granular cells. Each cell includes some portion of the 3D coordinate space. The camera positions 410 are 3D coordinates (XYZ) within the 3D coordinate space, so each camera position 410 is included in the 3D coordinate space assigned to a series of decreasingly granular cells. The camera position 410 and corresponding elapsed time 214 are stored within the most granular cell of the series. The method 720 then proceeds to step 920.

At step 920, the collage engine 128 computes the accumulated camera time for each cell of the octree spatial decomposition. The collage engine 128 may recursively compute the accumulated camera time for each cell. In doing so, the collage engine 128 sums the elapsed times 214 stored within each of the most granular cells. The collage engine 128 then sums the accumulated camera time of the child cells included within a parent cell to determine the accumulated camera time of the parent cell. The summing together of the accumulated camera times of the respective child cells continues until the collage engine 128 has determined the accumulated camera time of all the cells. The accumulated camera time of the largest cell is the total camera time. The method 720 then proceeds to step 925.

At step 925, the collage engine 128 determines the dominant cell within the octree spatial decomposition. The dominant cell is the most granular cell with a configurable percentage of the total camera time, such as e.g. 70% of the total camera time. The method 720 then proceeds to step 930.

At step 930, the collage engine 128 calculates the weighted average center location of the camera positions 410 within the dominant cell. The weighted average center location is weighted by the elapsed times 214 in the edit records 210 associated with the camera positions 410. The method 720 then proceeds to step 935.

At step 935, the collage engine 128 stores the camera data 218 that includes the camera position 410 closest to the weighted average center location, as an informative viewpoint for the segment 310. The collage engine 128 determines the camera position 410 that is closest to the weighted average center location within the 3D coordinate space of the dominant cell. Once the camera position 410 is determined, the collage engine 128 may search the edit records 210 associated with the segment 310 for the camera data 218 that includes the camera position 410. The collage engine 128 then stores the camera data 218 as an informative viewpoint that represents the segment 310. The method 720 then proceeds to step 940.

At step 940, the collage engine 128 determines whether there is another segment 310 for which to determine an informative viewpoint. If the collage engine 128 determines that a segment 310 does not have an informative viewpoint, then the method 720 returns to set 905. Otherwise, if an informative viewpoint is stored for every segment 310, then method 720 ends.

Figure 10:
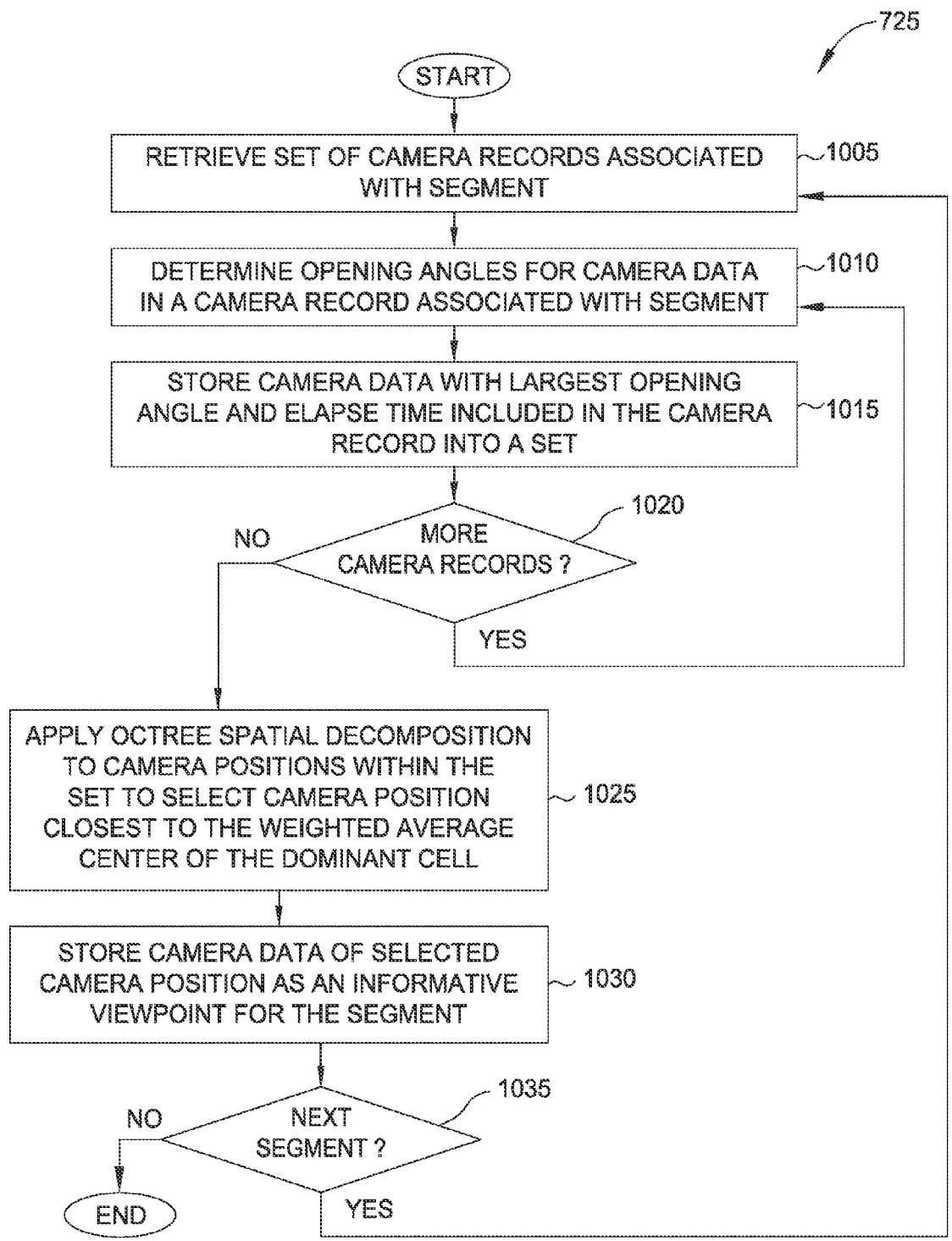
FIG. 10 sets forth a flow diagram detailing yet another one of the method steps of FIG. 7, according to one embodiment of the present invention.

FIG. 10 sets forth a flow diagram detailing step 725 of FIG. 7, according to one embodiment of the present invention. Among other things, FIG. 10 includes method sub-steps for determining an informative viewpoint from the set of camera records 220 associated with each segment 310 within a 3D model 122. Although the method steps are described in conjunction with the systems of FIGS. 1-6, persons skilled in the art will understand that any system configured to perform the method steps, in any order, is within the scope of the present invention.

As shown, the method sub-steps begin at step 1005, where the collage engine 128 shown in FIG. 1 retrieves the set of camera records 220 shown in FIG. 2 associated with a segment 310 shown in FIG. 3. The method 725 then proceeds to step 1010.

At step 1010, the collage engine 128 determines the opening angle of each camera data 218 in a camera record 220 associated with the segment 310. The camera data 218 includes a camera position 510 of FIG. 5, a camera look-at, and a camera up-vector. The opening angle may be determined from the size of the segment 310 within the viewpoint represented by the camera data 218. For example, if the 3D modeling tool 120 of FIG. 1 generated the camera record 220 based upon the end-user performing a zoom-out operation, then the dimension of the segment 310 within the viewpoint represented by the camera data 218 is inversely proportional to the distance between the camera position 510 and the camera look-at. The farther out the end-user zooms, the larger the opening angle. The method 725 then proceeds to step 1015.

At step 1015 the collage engine 128 stores the camera data 218 with the largest opening angle along with the elapse time 214 included in the camera record 220 into a set. The collage engine 128 may sort the camera data 128 according to the opening angles to determine the camera data 128 with the greatest opening angle. As discussed, the opening angle may be inversely proportional to the distance between the camera position 510 and the camera look-at of a camera data 218. Therefore, the camera data 218 with the camera position 510 farthest away from the segment 310 may have the greatest opening angle. The set may include camera data 218 and elapsed time 214 from multiple camera records 220 associated with the segment 310. The method 725 then proceeds to step 1020.

At step 1020, the collage engine 128 determines whether more camera records 220 are associated with the segment 310. If the collage engine 128 determines there are more camera records 220 associated with the segment 310, then the method 725 returns to step 1010. Otherwise, if there are no more camera records 220 associated with the segment 310, then the set includes camera data 218 and elapsed time 214 from each camera record 220 associated with the segment 310, and the method 725 proceeds to step 1025.

At step 1025, the collage engine 128 applies the same octree spatial decomposition technique described in conjunction with FIG. 7 to the set of camera positions 510 and elapse times 214, to select the camera position 510 closest to the weighted average center location within the 3D coordinate space of the dominant cell. The method 725 then proceeds to step 1030.

At step 1030, the collage engine 128 stores the camera data 218 that includes the camera position 510 closest to the weighted average center location as an informative viewpoint for the segment 310. The method 720 then proceeds to step 1035.

At step 1035, the collage engine 128 determines whether there is another segment 310 for which to determine an informative viewpoint. If the collage engine 128 determines that, a segment 310 does not have an informative viewpoint selected from camera records 220, then the method 720 returns to set 1005. Otherwise, if an informative viewpoint selected from camera records 220 is stored for every segment 310, then method 720 ends.

In sum, the disclosed techniques can be implemented to generate informative viewpoints for a 3D model based upon the editing history of the 3D model. More specifically, as an end-user creates a 3D model by interacting with a modeling tool, the modeling tool records the edit and camera operations in a log. The log entry associated with a given editing or camera operation includes camera data that represents the viewpoints displayed during the operation.

When generating the informative viewpoints for the 3D model, the collage engine included within the 3D modeling tool calculates the total amount of time that the author performed editing operations that involved each vertex and then divides the surface of the 3D model into segments based upon the editing times of those vertices. Once the segments are determined, the collage engine selects a viewpoint used during an editing operation and a viewpoint used during a camera operation associated with each segment. The collage engine selects a viewpoint used during an editing operation on the segment by implementing a spatial clustering procedure, which involves first calculating an area where the author positioned the majority of the viewpoints, and then selecting the viewpoint that was the closest to the center of the area. The collage engine I selects an informative viewpoint used during a camera operation associated with the segment by first identifying the viewpoint with the greatest opening angle from each camera operation associated with the segment. Generally, during an inspection procedure the end-user inspects the 3D model from the viewpoint with the greatest opening angle. The collage engine performs a spatial clustering procedure on the identified viewpoints with opening angles having a threshold value to select an informative viewpoint used during a camera operation associated with each segment.

After repeating the viewpoint analysis to compile the informative viewpoints from the editing operations and the camera operation associated with each segment, the collage engine generates a set of suggested 2D renderings of the 3D model based on the informative viewpoints. The collage engine also provides a collage generation interface, with which the author can select a certain number of 2D renderings to place into a collage template. The author may then share the 3D model by sending or publishing the collage of 2D renderings.

Advantageously, the collage engine is capable of automatically determining informative viewpoints from the viewpoints used by the end-user to inspect and edit the 3D model, thereby effectively generating collages of 2D renderings based upon the informative viewpoints, which represent the 3D model.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of the present invention is determined by the claims that follow.

What is claimed is:

1. A computer-implemented method for generating a collage of two-dimensional (2D) renderings that represent a three-dimensional (3D) model, the method comprising:
   generating a first segment that includes a plurality of vertices associated with a first surface region of the 3D model;
   selecting a plurality of edit records included in an edit log and corresponding to the first segment, wherein each edit record is associated with (i) a different edit operation applied to the plurality of vertices included in the first segment, (ii) an edit time that the edit operation was applied to the plurality of vertices, and (iii) a viewpoint implemented when rendering the 3D model during the associated edit operation;
   selecting a first viewpoint from the viewpoints associated with the plurality of records based on the edit times associated with the plurality of edit records;
   generating a first 2D rendering of the 3D model that represents the first segment relative to a perspective associated with the selected first viewpoint for inclusion in a collage of 2D renderings that represents the 3D model.

2. The computer-implemented method of claim 1, wherein selecting the first viewpoint comprises:
   generating an accumulated edit time for each vertex in the 3D model, wherein the accumulated edit time for a given vertex reflects a total amount of time that edit operations were applied to the given vertex; and
   selecting the first viewpoint based on the accumulated edit time associated with each vertex in the 3D model.

3. The computer-implemented method of claim 2, wherein generating the accumulated edit time for a given vertex in the 3D model comprises:
   retrieving a subset of edit records from the edit log that reflects one or more edit operations applied to the given vertex;
   parsing each edit record in the subset of edit records to extract the edit time, wherein the edit time associated with a given edit record reflects an elapsed time that a particular edit operation was applied to the given vertex; and
   accumulating the edit times across each edit record in the subset of edit records to generate the accumulated edit time for the given vertex.

4. The computer-implemented method of claim 1, wherein generating the first segment comprises performing a region-growing operation by:

generating a candidate set of vertices that includes each vertex in the 3D model;
selecting a first vertex in the candidate set of vertices having a greatest accumulated edit time relative to the other vertices in the candidate set of vertices;
removing the first vertex from the candidate set of vertices and adding the first vertex to the first segment;
identifying a second vertex that resides adjacent to the first vertex in the 3D model;
determining that the edit time associated with the second vertex exceeds a threshold value; and
removing the second vertex from the candidate set of vertices and adding the second vertex to the first segment.

5. The computer implemented method of claim 4, further comprising expanding the first segment by:
identifying an edit record included in the edit log and associated with a vertex included in the first segment that reflects an edit operation applied to the vertex and also applied to at least one vertex associated with the 3D model that is not included in the first segment; and
adding the at least one vertex to the first segment.

6. The computer-implemented method of claim 1, wherein selecting a first record in the plurality of edit records included in the edit log comprises:
retrieving a subset of edit records from the edit log that are associated with one or more edit operations applied to the vertices included in the first segment, wherein each edit record in the subset of edit records is associated with an edit operation applied to one or more vertices included in the first segment and with a viewpoint implemented when rendering the 3D model during the edit operation;
parsing the subset of edit records to extract a second plurality of viewpoints, wherein each viewpoint in the second plurality of viewpoints is associated with a different edit record in the subset of edit records;
placing each viewpoint in the second plurality of viewpoints into a 3D coordinate space that also includes the 3D model;
selecting the first edit record based on a spatial relationship between the associated viewpoint and other viewpoints in the second plurality of viewpoints.

7. The computer-implemented method of claim 6, wherein selecting the first edit record based on the spatial relationship comprises:
performing an octree decomposition based on the 3D coordinate space to generate a plurality of cells, wherein each cell is associated with a set of viewpoints included in the second plurality of viewpoints;
computing a total camera time for each cell in the plurality of cells, wherein the total camera time for a given cell reflects an accumulated amount of time associated with rendering the 3D model from each viewpoint associated with the given cell;
identifying a first cell within the plurality of cells having the greatest total camera time relative to the other cells in the plurality of cells;
computing a weighted average center location for the first cell; and
selecting the first edit record by identifying the associated viewpoint as the viewpoint residing closest to the weighted average center location relative to the other viewpoints in the second plurality of viewpoints.

8. The computer-implemented method of claim 1, further comprising:
recording a plurality of camera records in the edit log, wherein each camera record is associated with a series of viewpoints implemented to render the first segment during a viewpoint modification operation;
selecting a first camera record included in the plurality of camera records and associated with a first series of viewpoints implemented to render the first segment during a first camera modification operation;
selecting a second viewpoint included in the first series of viewpoints; and
generating a second 2D rendering of the 3D model that represents the first segment relative to a perspective associated with the second viewpoint for inclusion in the collage of 2D renderings that represents the 3D model.

9. The computer-implemented method of claim 8, wherein selecting the first camera record included in the plurality of camera records comprises determining that the first camera record includes a viewpoint that is included in the first series of viewpoints and has a greater opening angle than other viewpoints associated with other camera records included in the plurality of camera records.

10. A non-transitory computer-readable medium storing program instructions that, when executed by a processor, cause the processor to generate a collage of two-dimensional (2D) renderings that represent a three-dimensional (3D) model, by performing the steps of:
generating a first segment that includes a plurality of vertices associated with a first surface region of the 3D model;
selecting a plurality of edit records included in an edit log and corresponding to the first segment, wherein each edit record is associated with (i) a different edit operation applied to the plurality of vertices included in the first segment, (ii) an edit time that the edit operation was applied to the plurality of vertices, and (iii) a viewpoint implemented when rendering the 3D model during the associated edit operation;
selecting a first viewpoint from the viewpoints associated with the plurality of records based on the edit times associated with the plurality of edit records:
generating a first 2D rendering of the 3D model that represents the first segment relative to a perspective associated with the selected first viewpoint for inclusion in a collage of 2D renderings that represents the 3D model.

11. The non-transitory computer-readable medium of claim 10, wherein selecting the first viewpoint comprises:
generating an accumulated edit time for each vertex in the 3D model, wherein the accumulated edit time for a given vertex reflects a total amount of time that edit operations were applied to the given vertex; and
selecting the first viewpoint based on the accumulated edit time associated with each vertex in the 3D model.

12. The non-transitory computer-readable medium of claim 11, wherein generating the accumulated edit time for a given vertex in the 3D model comprises:
retrieving a subset of edit records from the edit log that reflects one or more edit operations applied to the given vertex;
parsing each edit record in the subset of edit records to extract the edit time, wherein the edit time associated with a given edit record reflects an elapsed time that a particular edit operation was applied to the given vertex; and accumulating the edit times across each edit record in the subset of edit records to generate the accumulated edit time for the given vertex.

13. The non-transitory computer-readable medium of claim 10, wherein generating the first segment comprises performing a region-growing operation by:
generating a candidate set of vertices that includes each vertex in the 3D model;
selecting a first vertex in the candidate set of vertices having a greatest accumulated edit time relative to the other vertices in the candidate set of vertices;
removing the first vertex from the candidate set of vertices and adding the first vertex to the first segment;
identifying a second vertex that resides adjacent to the first vertex in the 3D model;
determining that the edit time associated with the second vertex exceeds a threshold value; and
removing the second vertex from the candidate set of vertices and adding the second vertex to the first segment.

14. The non-transitory computer-readable medium of claim 13, further comprising expanding the first segment by:
identifying an edit record included in the edit log and associated with a vertex included in the first segment that reflects an edit operation applied to the vertex and also applied to at least one vertex associated with the 3D model that is not included in the first segment; and
adding the at least one vertex to the first segment.

15. The non-transitory computer-readable medium of claim 10, wherein selecting a first record in the plurality of edit records included in the edit log comprises:
retrieving a subset of edit records from the edit log that are associated with one or more edit operations applied to the vertices included in the first segment, wherein each edit record in the subset of edit records is associated with an edit operation applied to one or more vertices included in the first segment and with a viewpoint implemented when rendering the 3D model during the edit operation;
parsing the subset of edit records to extract a second plurality of viewpoints, wherein each viewpoint in the second plurality of viewpoints is associated with a different edit record in the subset of edit records;
placing each viewpoint in the second plurality of viewpoints into a 3D coordinate space that also includes the 3D model;
selecting the first edit record based on a spatial relationship between the associated viewpoint and other viewpoints in the second plurality of viewpoints.

16. The non-transitory computer-readable medium of claim 15, wherein selecting the first edit record based on the spatial relationship comprises:
performing an octree decomposition based on the 3D coordinate space to generate a plurality of cells, wherein each cell is associated with a set of viewpoints included in the second plurality of viewpoints;
computing a total camera time for each cell in the plurality of cells, wherein the total camera time for a given cell reflects an accumulated amount of time associated with rendering the 3D model from each viewpoint associated with the given cell;
identifying a first cell within the plurality of cells having the greatest total camera time relative to the other cells in the plurality of cells;
computing a weighted average center location for the first cell; and
selecting the first edit record by identifying the associated viewpoint as the viewpoint residing closest to the weighted average center location relative to the other viewpoints in the second plurality of viewpoints.

17. The non-transitory computer-readable medium of claim 10, further comprising:
recording a plurality of camera records in the edit log, wherein each camera record is associated with a series of viewpoints implemented to render the first segment during a viewpoint modification operation;
selecting a first camera record included in the plurality of camera records and associated with a first series of viewpoints implemented to render the first segment during a first camera modification operation;
selecting a second viewpoint included in the first series of viewpoints; and
generating a second 2D rendering of the 3D model that represents the first segment relative to a perspective associated with the second viewpoint for inclusion in the collage of 2D renderings that represents the 3D model.

18. The non-transitory computer-readable medium of claim 17, wherein selecting the first camera record included in the plurality of camera records comprises determining that the first camera record includes a viewpoint that is included in the first series of viewpoints and has a greater opening angle than other viewpoints associated with other camera records included in the plurality of camera records.

19. The non-transitory computer-readable medium of claim 17, wherein selecting the second viewpoint from within the first series of viewpoints comprises:
placing each viewpoint in the first series of viewpoints into a 3D coordinate space that also includes the 3D model; and
selecting the first camera record based on a spatial relationship between the second viewpoint associated with the first camera record and the other viewpoints in the first series of viewpoints.

20. A computer system configured to generate a collage of two-dimensional (2D) renderings that represent a three-dimensional (3D) model, including:
a memory that includes a 3D modeling tool having a collage engine; and a processing unit coupled to the memory, wherein, upon executing the 3D modeling tool, the 3D modeling tool configures the processor to:
generate a first segment that includes a plurality of vertices associated with a first surface region of the 3D model;
select a plurality of edit records included in an edit log and corresponding to the first segment, wherein each edit record is associated with (i) a different edit operation applied to the plurality of vertices included in the first segment, (ii) an edit time that the edit operation was applied to the plurality of vertices, and (iii) a viewpoint implemented when rendering the 3D model during the associated edit operation;
select a first viewpoint from the viewpoints associated with the plurality of records based on the edit times associated with the plurality of edit records;
generate a first 2D rendering of the 3D model that represents the first segment relative to a perspective associated with the selected first viewpoint for inclusion in a collage of 2D renderings that represents the 3D model.

* * * * *